US011395259B2

(12) United States Patent
Sandberg et al.

(10) Patent No.: US 11,395,259 B2
(45) Date of Patent: Jul. 19, 2022

(54) DOWNLINK MULTICAST FOR EFFICIENT FRONT-HAUL UTILIZATION IN A C-RAN

(71) Applicant: CommScope Technologies LLC, Hickory, NC (US)

(72) Inventors: Stuart D. Sandberg, Acton, MA (US); Irfaan Ahamed Salahuddeen, Acton, MA (US)

(73) Assignee: CommScope Technologies LLC, Hickory, NC (US)

( * ) Notice: Subject to any disclaimer, the term of this patent is extended or adjusted under 35 U.S.C. 154(b) by 12 days.

(21) Appl. No.: 16/413,385

(22) Filed: May 15, 2019

(65) Prior Publication Data

US 2019/0357173 A1    Nov. 21, 2019

Related U.S. Application Data

(60) Provisional application No. 62/672,393, filed on May 16, 2018.

(51) Int. Cl.
*H04L 12/18* (2006.01)
*H04W 72/00* (2009.01)

(52) U.S. Cl.
CPC ......... *H04W 72/005* (2013.01); *H04L 12/185* (2013.01); *H04L 12/1845* (2013.01)

(58) Field of Classification Search
CPC .............. H04W 72/005; H04W 88/085; H04L 12/185; H04L 12/1845; H04L 45/16
See application file for complete search history.

(56) References Cited

U.S. PATENT DOCUMENTS

| | | |
|---|---|---|
| 6,711,144 B1 | 3/2004 | Kim et al. |
| 6,731,618 B1 | 5/2004 | Chung et al. |
| 6,741,862 B2 | 5/2004 | Chung et al. |
| 6,781,999 B2 | 8/2004 | Eyuboglu et al. |
| 6,985,451 B1 | 1/2006 | Nattiv et al. |
| 7,170,871 B2 | 1/2007 | Eyuboglu et al. |
| 7,200,391 B2 | 4/2007 | Chung et al. |
| 7,242,958 B2 | 7/2007 | Chung et al. |
| 7,277,446 B1 | 10/2007 | Abi-Nassif et al. |
| 7,299,278 B2 | 11/2007 | Ch'ng |
| 7,415,242 B1 | 8/2008 | Ngan |
| 7,515,643 B2 | 4/2009 | Chung |
| 7,558,356 B2 | 7/2009 | Pollman et al. |
| 7,558,588 B2 | 7/2009 | To et al. |

(Continued)

FOREIGN PATENT DOCUMENTS

| | | |
|---|---|---|
| CN | 102340823 A | 2/2012 |
| CN | 106797641 A | 5/2017 |

(Continued)

OTHER PUBLICATIONS

International Searching Authority, "International Search Report and Written Opinion from PCT Application No. PCT/US2019/032511 dated Aug. 29, 2019", from Foreign Counterpart to U.S. Appl. No. 16/413,385, pp. 1-12, Published: WO.

(Continued)

*Primary Examiner* — Wei Zhao
(74) *Attorney, Agent, or Firm* — Fogg & Powers LLC (57) ABSTRACT

One embodiment is directed to transmitting downlink user data over the front haul in C-RAN using multicast addressing. Other embodiments are disclosed.

25 Claims, 6 Drawing Sheets

(56) References Cited

U.S. PATENT DOCUMENTS

| | | |
|---|---|---|
| 7,603,127 B2 | 10/2009 | Chung et al. |
| 7,626,926 B2 | 12/2009 | Abi-Nassif et al. |
| 7,672,682 B2 | 3/2010 | Sharma et al. |
| 7,715,466 B1 | 5/2010 | Oh et al. |
| 7,729,243 B2 | 6/2010 | Ananthaiyer et al. |
| 7,730,189 B2 | 6/2010 | Harikumar et al. |
| 7,751,835 B2 | 7/2010 | Sharma et al. |
| 7,801,487 B2 | 9/2010 | Mehrabanzad et al. |
| 7,831,257 B2 | 11/2010 | Pollman et al. |
| 7,835,698 B2 | 11/2010 | Eyuboglu et al. |
| 7,843,892 B2 | 11/2010 | Mehrabanzad et al. |
| 7,860,513 B2 | 12/2010 | Chung et al. |
| 7,907,571 B2 | 3/2011 | Raghothaman et al. |
| 7,920,541 B2 | 4/2011 | To et al. |
| 7,926,098 B2 | 4/2011 | Chinitz et al. |
| 7,933,619 B2 | 4/2011 | Kim |
| 7,934,001 B2 | 4/2011 | Harikumar et al. |
| 7,953,040 B2 | 5/2011 | Harikumar et al. |
| 7,983,672 B2 | 7/2011 | Humblet et al. |
| 7,983,708 B2 | 7/2011 | Mehrabanzad et al. |
| 7,995,493 B2 | 8/2011 | Anderlind et al. |
| 8,023,439 B2 | 9/2011 | Rao |
| 8,060,058 B2 | 11/2011 | Ch'ng et al. |
| 8,078,165 B2 | 12/2011 | Mate et al. |
| 8,085,696 B2 | 12/2011 | Garg et al. |
| 8,094,630 B2 | 1/2012 | Garg et al. |
| 8,099,504 B2 | 1/2012 | Cherian et al. |
| 8,111,253 B2 | 2/2012 | Rao |
| 8,130,686 B2 | 3/2012 | Rao et al. |
| 8,140,091 B2 | 3/2012 | Chung et al. |
| 8,145,221 B2 | 3/2012 | Garg et al. |
| 8,160,020 B2 | 4/2012 | Eyuboglu et al. |
| 8,160,629 B2 | 4/2012 | Mate et al. |
| 8,160,631 B2 | 4/2012 | Raghothaman et al. |
| 8,160,829 B2 | 4/2012 | Kalenine |
| 8,165,528 B2 | 4/2012 | Raghothaman et al. |
| 8,170,598 B2 | 5/2012 | Raghothaman et al. |
| 8,176,327 B2 | 5/2012 | Xiong et al. |
| 8,194,597 B2 | 6/2012 | Feder et al. |
| 8,195,187 B2 | 6/2012 | Eyuboglu et al. |
| 8,229,397 B2 | 7/2012 | Hou et al. |
| 8,229,498 B2 | 7/2012 | Ch'ng et al. |
| 8,259,671 B2 | 9/2012 | Raghothaman et al. |
| 8,280,376 B2 | 10/2012 | Rajagopalan et al. |
| 8,290,527 B2 | 10/2012 | Richardson |
| 8,295,256 B2 | 10/2012 | Humblet et al. |
| 8,295,818 B2 | 10/2012 | Palnati et al. |
| 8,311,570 B2 | 11/2012 | Richardson |
| 8,326,342 B2 | 12/2012 | Raghothaman et al. |
| 8,340,636 B2 | 12/2012 | Yin et al. |
| 8,345,694 B2 | 1/2013 | Den et al. |
| 8,346,220 B2 | 1/2013 | Mate et al. |
| 8,355,727 B2 | 1/2013 | Hoang et al. |
| 8,358,623 B2 | 1/2013 | Samar et al. |
| 8,379,566 B2 | 2/2013 | Gao et al. |
| 8,379,625 B2 | 2/2013 | Humblet |
| 8,385,291 B2 | 2/2013 | Richardson et al. |
| 8,400,989 B2 | 3/2013 | Ch'ng et al. |
| 8,402,143 B2 | 3/2013 | Ramaswamy et al. |
| 8,428,601 B2 | 4/2013 | Samar et al. |
| 8,452,299 B2 | 5/2013 | Raghothaman |
| 8,457,084 B2 | 6/2013 | Valmikam et al. |
| 8,503,342 B2 | 8/2013 | Richardson |
| 8,520,659 B2 | 8/2013 | Humblet |
| 8,532,658 B2 | 9/2013 | Knisely |
| 8,542,707 B2 | 9/2013 | Hou et al. |
| 8,543,139 B2 | 9/2013 | Samar et al. |
| 8,554,231 B2 | 10/2013 | Jones |
| 8,594,663 B2 | 11/2013 | Ch'ng et al. |
| 8,615,238 B2 | 12/2013 | Eyuboglu et al. |
| 8,615,593 B2 | 12/2013 | Ch'ng et al. |
| 8,619,702 B2 | 12/2013 | Garg et al. |
| 8,639,247 B2 | 1/2014 | Ng et al. |
| 8,688,809 B2 | 4/2014 | Ch'ng et al. |
| 8,693,987 B2 | 4/2014 | Chiussi et al. |
| 8,705,483 B2 | 4/2014 | Liu |
| 8,718,697 B2 | 5/2014 | Srinivas et al. |
| 8,731,574 B2 | 5/2014 | Ch'ng et al. |
| 8,750,271 B2 | 6/2014 | Jones |
| 8,774,134 B2 | 7/2014 | Raghothaman et al. |
| 8,781,483 B2 | 7/2014 | Ch'ng |
| 8,805,371 B2 | 8/2014 | Richardson et al. |
| 8,843,638 B2 | 9/2014 | Garg et al. |
| 8,873,512 B2 | 10/2014 | Richardson et al. |
| 8,886,249 B2 | 11/2014 | Richardson |
| 8,909,278 B2 | 12/2014 | Rao et al. |
| 8,942,136 B2 | 1/2015 | Humblet |
| 8,953,566 B2 | 2/2015 | Hegde et al. |
| 8,958,809 B2 | 2/2015 | Nama et al. |
| 8,982,841 B2 | 3/2015 | Srinivasan |
| 9,078,284 B2 | 7/2015 | Richardson |
| 9,380,466 B2 | 6/2016 | Eyuboglu et al. |
| 9,414,399 B2 | 8/2016 | Eyuboglu et al. |
| 9,877,340 B1 | 1/2018 | Park et al. |
| 9,936,470 B2 | 4/2018 | Eyuboglu et al. |
| 10,057,916 B2 | 8/2018 | Barabell et al. |
| 10,064,072 B2 | 8/2018 | Eyuboglu et al. |
| 10,142,858 B2 | 11/2018 | Eyuboglu et al. |
| 2002/0128009 A1 | 9/2002 | Boch et al. |
| 2002/0154055 A1 | 10/2002 | Davis et al. |
| 2002/0194605 A1 | 12/2002 | Cohen et al. |
| 2004/0022208 A1* | 2/2004 | Dahod ............... H04W 76/45 370/328 |
| 2004/0136373 A1 | 7/2004 | Bareis |
| 2004/0143442 A1 | 7/2004 | Knight |
| 2004/0146072 A1 | 7/2004 | Farmwald |
| 2004/0224637 A1 | 11/2004 | Silva et al. |
| 2005/0025160 A1 | 2/2005 | Meier et al. |
| 2005/0073964 A1 | 4/2005 | Schmidt et al. |
| 2005/0157675 A1 | 7/2005 | Feder et al. |
| 2005/0243785 A1 | 11/2005 | Sabat, Jr. et al. |
| 2006/0056459 A1 | 3/2006 | Stratton et al. |
| 2006/0056559 A1 | 3/2006 | Pleasant et al. |
| 2006/0209752 A1 | 9/2006 | Wijngaarden et al. |
| 2007/0023419 A1 | 2/2007 | Ptasienski et al. |
| 2007/0058683 A1 | 3/2007 | Futami et al. |
| 2007/0086487 A1 | 4/2007 | Yasuda et al. |
| 2007/0140218 A1 | 6/2007 | Nair et al. |
| 2007/0207838 A1 | 9/2007 | Kuwahara et al. |
| 2007/0220573 A1 | 9/2007 | Chiussi et al. |
| 2007/0230419 A1 | 10/2007 | Raman et al. |
| 2007/0242648 A1 | 10/2007 | Garg et al. |
| 2008/0003988 A1 | 1/2008 | Richardson |
| 2008/0200202 A1 | 8/2008 | Montojo et al. |
| 2008/0233886 A1 | 9/2008 | Kaminski et al. |
| 2008/0240034 A1 | 10/2008 | Gollamudi |
| 2009/0061771 A1* | 3/2009 | Ma ................. H04B 7/2606 455/41.2 |
| 2009/0097444 A1 | 4/2009 | Lohr et al. |
| 2009/0135718 A1 | 5/2009 | Yeo et al. |
| 2009/0149221 A1 | 6/2009 | Liu et al. |
| 2009/0180423 A1 | 7/2009 | Kroener |
| 2009/0180435 A1 | 7/2009 | Sarkar |
| 2009/0265599 A1 | 10/2009 | Chae et al. |
| 2009/0276542 A1 | 11/2009 | Aweya et al. |
| 2009/0287976 A1 | 11/2009 | Wang et al. |
| 2009/0300453 A1 | 12/2009 | Sahara |
| 2009/0316626 A1 | 12/2009 | Lee et al. |
| 2009/0327829 A1 | 12/2009 | Yang et al. |
| 2010/0011269 A1 | 1/2010 | Budianu et al. |
| 2010/0011271 A1 | 1/2010 | Giancola et al. |
| 2010/0034135 A1 | 2/2010 | Kim et al. |
| 2010/0037115 A1 | 2/2010 | Zheng |
| 2010/0062768 A1 | 3/2010 | Lindqvist et al. |
| 2010/0115367 A1 | 5/2010 | Hsu |
| 2010/0118777 A1 | 5/2010 | Yamada et al. |
| 2010/0142494 A1 | 6/2010 | Hsu |
| 2010/0167718 A1 | 7/2010 | Chiussi et al. |
| 2010/0169732 A1 | 7/2010 | Wu |
| 2010/0185911 A1 | 7/2010 | Cheng |
| 2010/0234035 A1 | 9/2010 | Fujishima et al. |
| 2010/0246513 A1 | 9/2010 | Lindskog et al. |
| 2010/0257419 A1 | 10/2010 | Sung et al. |
| 2011/0134862 A1 | 6/2011 | Huang et al. |

(56) References Cited

U.S. PATENT DOCUMENTS

| | | |
|---|---|---|
| 2011/0145672 A1 | 6/2011 | Jongren et al. |
| 2011/0170517 A1 | 7/2011 | Bakker et al. |
| 2011/0182255 A1 | 7/2011 | Kim et al. |
| 2011/0194548 A1 | 8/2011 | Feder et al. |
| 2011/0194630 A1 | 8/2011 | Yang et al. |
| 2011/0268007 A1 | 11/2011 | Barany et al. |
| 2011/0287791 A1 | 11/2011 | Fujishima et al. |
| 2011/0310802 A1 | 12/2011 | Song et al. |
| 2012/0057572 A1 | 3/2012 | Evans et al. |
| 2012/0127947 A1 | 5/2012 | Usui |
| 2012/0140660 A1 | 6/2012 | Kang et al. |
| 2012/0147815 A1 | 6/2012 | Meyer et al. |
| 2012/0176884 A1 | 7/2012 | Zhang et al. |
| 2012/0176966 A1 | 7/2012 | Ling |
| 2012/0176980 A1 | 7/2012 | Moon et al. |
| 2012/0176996 A1 | 7/2012 | Kim et al. |
| 2012/0189074 A1 | 7/2012 | Jin et al. |
| 2012/0195284 A1 | 8/2012 | Mann et al. |
| 2012/0207105 A1 | 8/2012 | Geirhofer et al. |
| 2012/0208581 A1 | 8/2012 | Ishida et al. |
| 2012/0213109 A1 | 8/2012 | Xu et al. |
| 2012/0250520 A1 | 10/2012 | Chen et al. |
| 2012/0250740 A1 | 10/2012 | Ling |
| 2012/0257570 A1 | 10/2012 | Jang et al. |
| 2012/0264470 A1 | 10/2012 | Bajj et al. |
| 2012/0300635 A1 | 11/2012 | Jersenius et al. |
| 2012/0300766 A1 | 11/2012 | Chen et al. |
| 2013/0016686 A1 | 1/2013 | Li et al. |
| 2013/0034197 A1 | 2/2013 | Aweya et al. |
| 2013/0095871 A1 | 4/2013 | Soriaga et al. |
| 2013/0100948 A1 | 4/2013 | Irvine |
| 2013/0136053 A1 | 5/2013 | Kim et al. |
| 2013/0136104 A1 | 5/2013 | Samar et al. |
| 2013/0194985 A1 | 8/2013 | Zetterman et al. |
| 2013/0223307 A1 | 8/2013 | Ohlsson et al. |
| 2013/0223365 A1 | 8/2013 | Choi et al. |
| 2013/0223391 A1 | 8/2013 | Koo et al. |
| 2013/0229992 A1 | 9/2013 | Yue et al. |
| 2013/0242837 A1 | 9/2013 | Yang et al. |
| 2013/0242919 A1 | 9/2013 | Koo et al. |
| 2013/0250869 A1 | 9/2013 | Eriksson |
| 2013/0279452 A1 | 10/2013 | Liu |
| 2013/0294403 A1 | 11/2013 | Srinivasan |
| 2014/0003389 A1 | 1/2014 | Wang et al. |
| 2014/0031036 A1 | 1/2014 | Koo et al. |
| 2014/0044057 A1 | 2/2014 | Gaal et al. |
| 2014/0071868 A1 | 3/2014 | Bergquist et al. |
| 2014/0086112 A1 | 3/2014 | Stern-Berkowitz et al. |
| 2014/0126438 A1 | 5/2014 | Zhu et al. |
| 2014/0161070 A1 | 6/2014 | Chang et al. |
| 2014/0162664 A1 | 6/2014 | Stapleton et al. |
| 2014/0177506 A1 | 6/2014 | Korus et al. |
| 2014/0177549 A1 | 6/2014 | Knisely |
| 2014/0211690 A1 | 7/2014 | Nama et al. |
| 2014/0212269 A1 | 7/2014 | Kastner et al. |
| 2014/0219162 A1 | 8/2014 | Eyuboglu et al. |
| 2014/0219255 A1 | 8/2014 | Eyuboglu et al. |
| 2014/0219267 A1 | 8/2014 | Eyuboglu et al. |
| 2015/0011219 A1 | 1/2015 | Saily et al. |
| 2015/0085720 A1 | 3/2015 | Gaal et al. |
| 2015/0172023 A1 | 6/2015 | Yang et al. |
| 2015/0193282 A1 | 7/2015 | Blocksome |
| 2015/0256297 A1 | 9/2015 | Yang et al. |
| 2015/0304960 A1 | 10/2015 | Yang et al. |
| 2016/0037550 A1 | 2/2016 | Barabell et al. |
| 2016/0044548 A1 | 2/2016 | Choi et al. |
| 2016/0242147 A1* | 8/2016 | Tarlazzi ............... H04W 72/04 |
| 2016/0302088 A1 | 10/2016 | Eyuboglu et al. |
| 2016/0309347 A1 | 10/2016 | Eyuboglu et al. |
| 2016/0345342 A1 | 11/2016 | Eyuboglu et al. |
| 2017/0135121 A1 | 5/2017 | Eyuboglu et al. |
| 2017/0163330 A1 | 6/2017 | Raleigh et al. |
| 2017/0257151 A1 | 9/2017 | Lange |
| 2019/0037421 A1 | 1/2019 | Eyuboglu et al. |
| 2019/0069190 A1 | 2/2019 | Eyuboglu et al. |
| 2019/0075576 A1 | 3/2019 | Eyuboglu et al. |

FOREIGN PATENT DOCUMENTS

| | | |
|---|---|---|
| EP | 1134935 A2 | 9/2001 |
| EP | 2352264 A1 | 8/2011 |
| EP | 2787646 A1 | 10/2014 |
| WO | 2007027032 A1 | 3/2007 |
| WO | 2014124160 A2 | 8/2014 |
| WO | 2015191530 A2 | 12/2015 |
| WO | 2017100096 A1 | 6/2017 |

OTHER PUBLICATIONS

"3rd Generation Partnership Project; Technical Specification Group Radio Access Network; Evolved Universal Terrestrial Radio Access (E-UTRA); Requirements for support of radio resource management", 3GPP, Mar. 2008, pp. 1-25, 3GPP Organizational Partners.

"3rd Generation Partnership Project; Technical Specification Group Radio Access Network; Evolved Universal Terrestrial Radio Access (E-UTRA); Base Station (BS) radio transmission and reception", 3GPP, Dec. 2007, pp. 1-47, 3GPP Organizational Partners.

"Small Cell Virtualization Functional Splits and Use Cases", Small Cell Forum, Jun. 2015, pp. 1-58, www.smallcellforum.com.

Belhouchet et al., "4G Wireless Systems, LTE Technology, Session 3: LTE Overview—Design Targets and Multiple Access Technologies", ITU/BDT Arab Regional Workshop, 2010, pp. 1-82, ERT.

Dotsch, et al., "Quantitative Analysis of Split Base Station Processing and Determination of Advantageous Architectures for LTE", Bell Labs Technical Journal, 2013, pp. 1-24, vol. 18, No. 1, Wiley Periodicals.

Garner, "IEEE 1588 Version 2", ISPCS, Sep. 24, 2008, pp. 1-89.

Haberland et al., "Base Stations in the Cloud", Alcatel-Lucent, Sep. 28, 2012, pp. 1-23, www.alcatel-lucent.com.

Ma et al., "Radiostar: Providing Wireless Coverage Over Gigabit Ethernet", Bell Labs Technical Journal, 2009, pp. 1-18, vol. 14, No. 1, Wiley Periodicals.

Zhu, ZhenBo et al., "Virtual Base Station Pool: Towards a Wireless Network Cloud for Radio Access Networks", May 17-19, 2010, pp. 1-10, Published in: Bertinoro, Italy.

European Patent Office, "Extended European Search Report from EP Application No. 19803871.3" Dec. 17, 2021, from Foreign Counterpart to U.S. Appl. No. 16/413,385, pp. 1 through 7, Published: EP.

* cited by examiner

DOWNLINK MULTICAST FOR EFFICIENT FRONT-HAUL UTILIZATION IN A C-RAN

CROSS-REFERENCE TO RELATED APPLICATION

This application claims the benefit of U.S. Provisional Patent Application Ser. No. 62/672,393, filed on May 16, 2018, and titled "DOWNLINK MULTICAST FOR EFFICIENT FRONT-HAUL UTILIZATION IN A C-RAN", which is hereby incorporated herein by reference.

BACKGROUND

A centralized radio access network (C-RAN) can be used to implement base station functionality for providing wireless service to user equipment (UE). Typically, for each cell implemented by the C-RAN, one or more baseband units (BBUs) (also referred to here as "baseband controllers") interact with multiple remote units (also referred to here as "radio points" or "RPs"). Each BBU is coupled to the radio points over front-haul communication links or a front-haul network.

Downlink user data is scheduled for wireless transmission to each UE. When a C-RAN is used, the downlink user data can be simulcast to a set of radio points of the C-RAN. This set of radio points is also referred to here as the "simulcast zone" for the UE. The respective simulcast zone can vary from UE to UE. The downlink user data for each UE must be communicated from each relevant BBU over the front-haul to each radio point in that UE's simulcast zone.

Where a C-RAN is used to provide Long Term Evolution (LTE) wireless service, downlink user data scheduled for wireless transmission to each UE is communicated over the front-haul in transport blocks (TBs). The front-haul can be implemented using a switched Ethernet network.

One way that downlink user data can be communicated to the radio points over the front-haul is by fragmenting the TBs into a sequence of packets and broadcasting each such packet to all of the radio points. That is, each such packet contains an Internet Protocol (IP) destination address header indicating to the front-haul Ethernet switches to forward each packet to all radio points of the C-RAN. Broadcast is inefficient because all RPs receive packets containing downlink user data for all UEs, even if a given RP is not in the simulcast zone of a given UE. That is, each RP will receive packets containing downlink user data that the RP does not need. This can unnecessarily increase the bandwidth requirements for front-haul Ethernet links that terminate at the RPs and possibly for Ethernet links in nearby switches.

In one example, 20 MHz LTE bandwidth requiring 200 megabits-per-second (Mbps) of front-haul bandwidth is used for each downlink carrier. In such an example, each RP supports 4 downlink carriers, and the C-RAN supports downlink frequency reuse where each downlink frequency can be reused four times within the cell. In such an example, a front-haul Ethernet bandwidth of about 4×4×200 Mbps=3200 Mbps is required at each RP, even though each RP will actually use at most 800 Mbps of this bandwidth. (In this example, each RP supports at most 4 downlink carriers even if downlink reuse is being used in the cell.)

Alternatively, bandwidth requirements at the RP can be minimized by using unicast addressing to send packets containing downlink user data to only a single radio point. Each RP has a unique IP address. Each BBU makes copies of the downlink user data for each UE, one for each RP in the UE's simulcast zone. The BBU transmits each copy over the front-haul to one of the RPs in the UE's simulcast zone using packets that are addressed to the RP's IP address. Unicast addressing results in each RP receiving only the downlink user data it needs, but the bandwidth requirements for the Ethernet links that originate at the BBU are increased by a factor depending on the maximum number of RPs that can be included a simulcast zone.

In the LTE example set forth above, if unicast addressing is used and the maximum number of RPs in a simulcast zone is 8, the front-haul bandwidth requirement at the Ethernet link that originates at a BBU supporting one downlink carrier is 8×4×200 Mbps=6400 Mbps, even though the max non-redundant bandwidth at each RP is 800 Mbps.

In comparing broadcast versus unicast for communicating downlink user data over an Ethernet front-haul in a C-RAN, there is a tradeoff between high bandwidth inefficiency near the RPs and high bandwidth inefficiency near the BBU.

SUMMARY

One embodiment is directed to a system to provide wireless service. The system comprises a controller and a plurality of radio points. Each of the radio points is associated with at least one antenna and remotely located from the controller, wherein the plurality of radio points is communicatively coupled to the controller over a front haul. The controller and the plurality of radio points are configured to implement a base station in order to provide wireless service to a plurality of user equipment (UEs) using a cell. The controller is communicatively coupled to a core network of a wireless service provider. The controller is configured to determine a simulcast zone for a UE, the simulcast zone comprising a plurality of radio points from which downlink user data is wirelessly communicated to the UE. The controller is configured to attempt to form a multicast zone for the simulcast zone, the multicast zone comprising a plurality of multicast groups implemented by the front haul. The controller is configured to, if the multicast zone is successfully formed, transmit downlink user data for the UE to the radio points in the simulcast zone over the front haul by transmitting the downlink user data to the multicast groups.

Another embodiment is directed to a method of providing wireless service to user equipment (UE) using a system comprising a controller and a plurality of radio points. Each of the radio points is associated with at least one antenna and remotely located from the controller. The plurality of radio points is communicatively coupled to the controller over a front haul. The controller and the plurality of radio points are configured to implement a base station in order to provide wireless service to a plurality of user equipment (UEs) using a cell. The method comprises determining a simulcast zone for a UE, the simulcast zone comprising a plurality of radio points from which downlink user data is wirelessly communicated to the UE. The method further comprises attempting to form a multicast zone for the simulcast zone, the multicast zone comprising a plurality of multicast groups implemented by the front haul. The method further comprises, if the multicast zone is successfully formed, transmitting downlink user data for the UE to the radio points in the simulcast zone over the front haul by transmitting the downlink user data to the multicast groups.

DRAWINGS

Like reference numbers and designations in the various drawings indicate like elements.

DETAILED DESCRIPTION

Figure 1A:
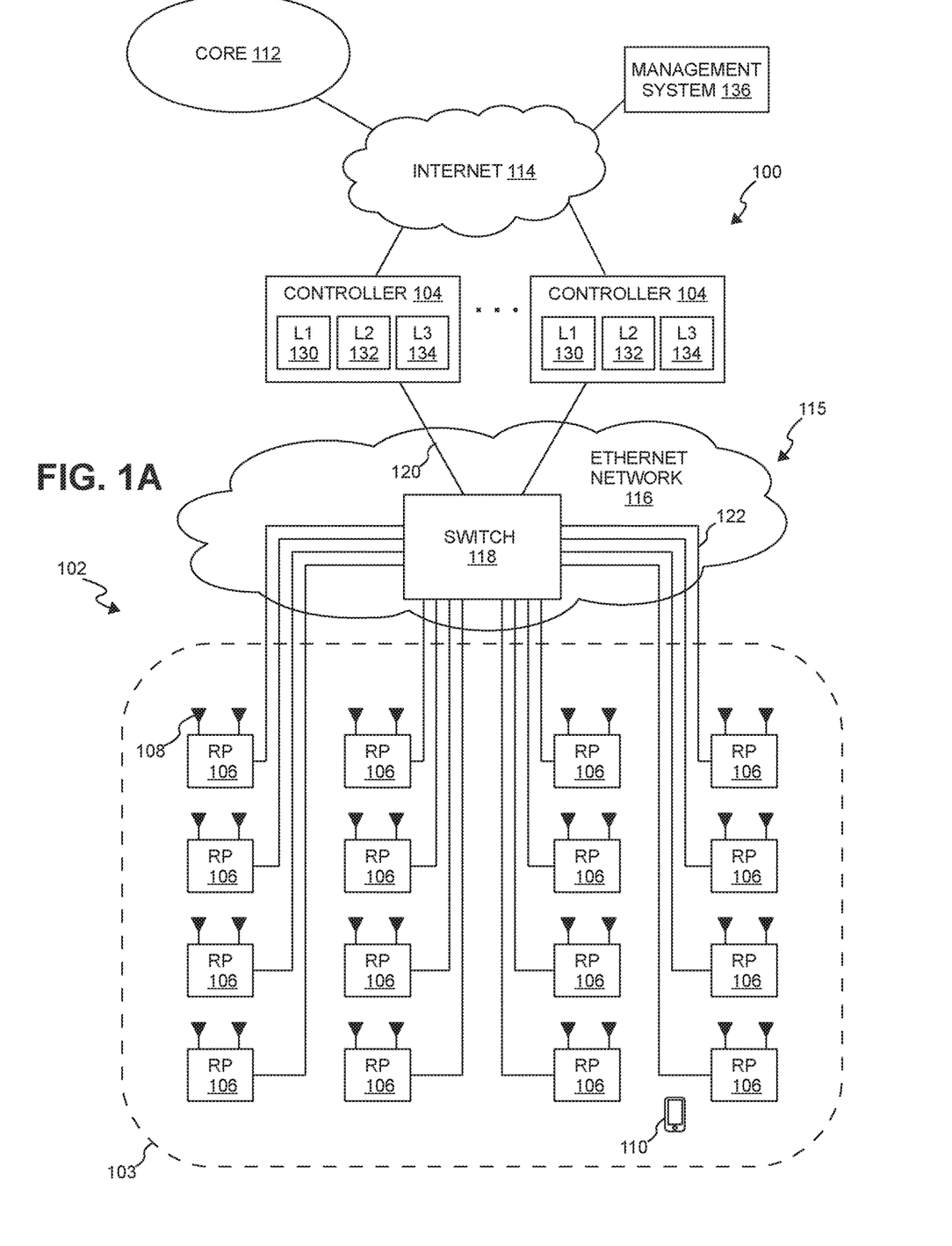
FIGS. 1A-1C are block diagrams illustrating one exemplary embodiment of a radio access network (RAN) system in which the front-haul efficiency techniques described here can be implemented.
Figure 1B:
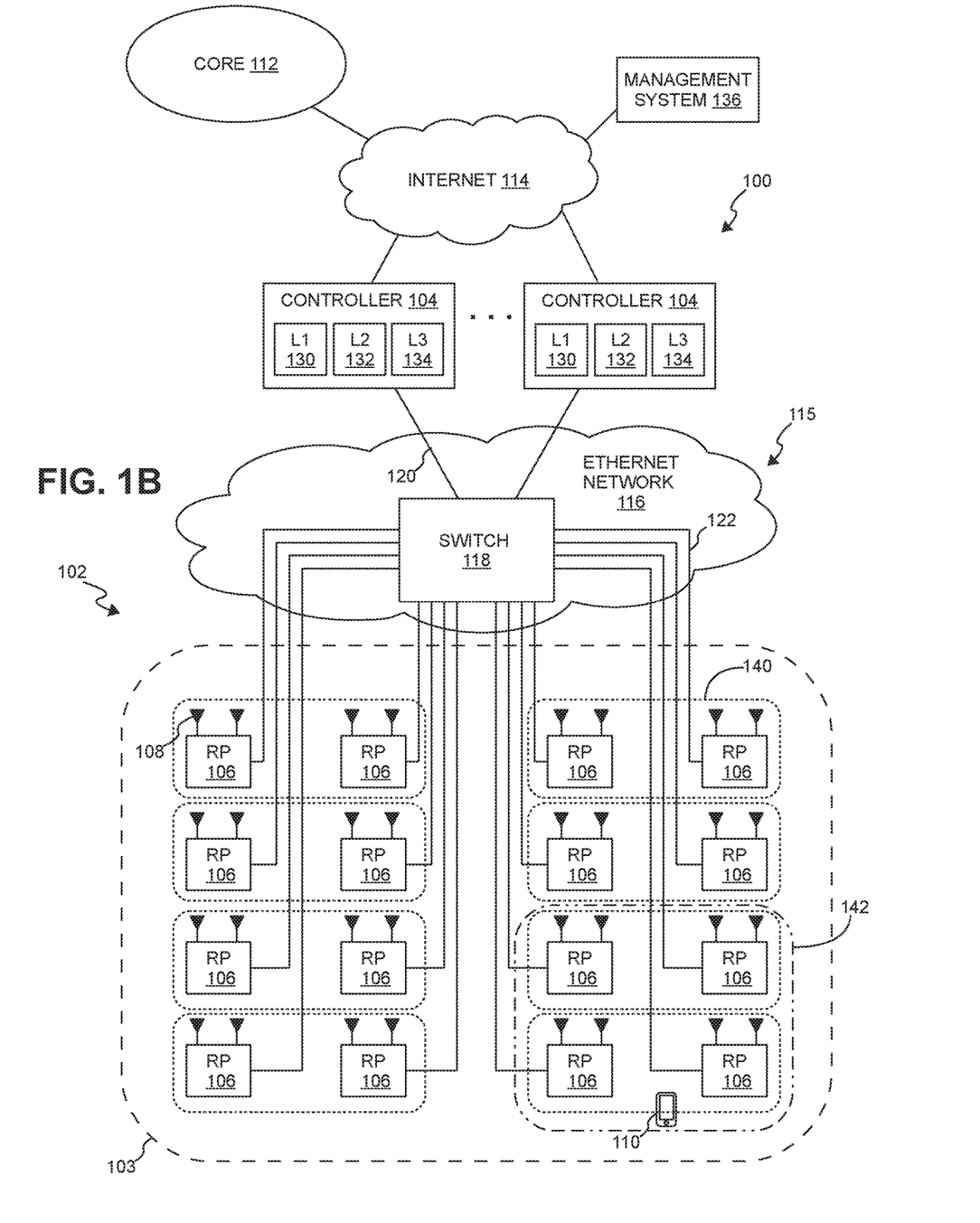
Figure 1C:
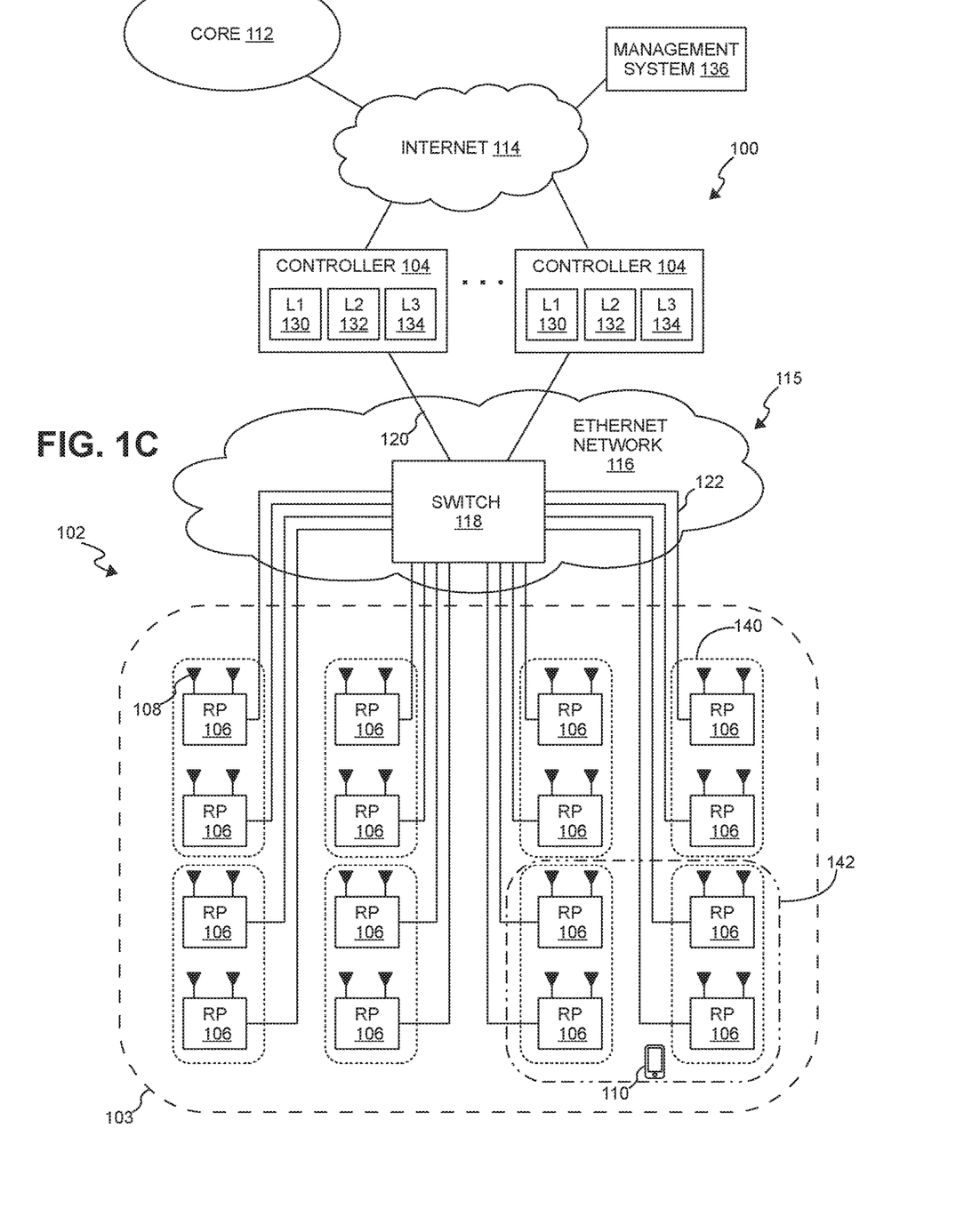

FIGS. 1A-1C are block diagrams illustrating one exemplary embodiment of a radio access network (RAN) system 100 in which the front-haul efficiency techniques described here can be implemented. The system 100 is deployed at a site 102 to provide wireless coverage and capacity for one or more wireless network operators. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIGS. 1A-1C, the system 100 is implemented at least in part using a C-RAN architecture that employs at least one baseband unit 104 and multiple radio points (RPs) 106. The system 100 is also referred to here as a "C-RAN system" 100. Each RP 106 is remotely located from the baseband unit 104. Also, in this exemplary embodiment, at least one of the RPs 106 is remotely located from at least one other RP 106. The baseband unit 104 and RPs 106 serve at least one cell 103. The baseband units 104 are also referred to here as "baseband controllers" 104 or just "controllers" 104. Each RP 106 includes or is coupled to one or more antennas 108 via which downlink RF signals are radiated to user equipment (UE) 110 and via which uplink RF signals transmitted by UEs 110 are received.

More specifically, in the example shown in FIGS. 1A-1C, each RP 106 comprises two antennas 108. Each RP 106 can include or be coupled to a different number of antennas 108.

The system 100 is coupled to the core network 112 of each wireless network operator over an appropriate back-haul. In the exemplary embodiment shown in FIGS. 1A-1C, the Internet 114 is used for back-haul between the system 100 and each core network 112. However, it is to be understood that the back-haul can be implemented in other ways.

The exemplary embodiment of the system 100 shown in FIGS. 1A-1C is described here as being implemented as a Long Term Evolution (LTE) radio access network providing wireless service using an LTE air interface. LTE is a standard developed by 3GPP standards organization. In this embodiment, the controller 104 and RPs 106 together are used to implement an LTE Evolved Node B (also referred to here as an "eNodeB" or "eNB") that is used to provide user equipment 110 with mobile access to the wireless network operator's core network 112 to enable the user equipment 110 to wirelessly communicate data and voice (using, for example, Voice over LTE (VoLTE) technology).

Also, in this exemplary LTE embodiment, each core network 112 is implemented as an Evolved Packet Core (EPC) 112 comprising standard LTE EPC network elements such as, for example, a mobility management entity (MME) (not shown) and a Serving Gateway (SGW) (not shown) and, optionally, a Home eNodeB gateway (HeNB GW) (not shown) and a Security Gateway (SeGW) (not shown).

Moreover, in this exemplary embodiment, each controller 104 communicates with the MME and SGW in the EPC core network 112 using the LTE S1 interface and communicates with other eNodeBs using the LTE X2 interface. For example, each controller 104 can communicate with an outdoor macro eNodeB (not shown) (or another controller 104 implementing a different eNodeB) via the LTE X2 interface.

Each controller 104 and the radio points 106 can be implemented so as to use an air interface that supports one or more of frequency-division duplexing (FDD) and/or time-division duplexing (TDD). Also, the controller 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controller 104 and the radio points 106 can implement one or more of the LTE transmission modes. Moreover, the controller 104 and/or the radio points 106 can be configured to support multiple air interfaces and/or to support multiple wireless operators.

In the exemplary embodiment shown in FIGS. 1A-1C, the front-haul 115 that communicatively couples each controller 104 to the one or more RPs 106 is implemented using a standard switched ETHERNET network 116. However, it is to be understood that the front-haul between the controllers 104 and RPs 106 can be implemented in other ways.

The switched Ethernet network 116 comprises one or more Ethernet switches 118. Each baseband controller 104 is communicatively coupled to one or more switches 118 via a respective one or more Ethernet links 120 (which are also referred to here as "baseband controller Ethernet links"). Each RP 106 is communicatively coupled to one or more switches 118 via a respective one or more Ethernet links 124 (which are also referred to here as "RP Ethernet links").

Generally, one or more nodes in a C-RAN perform analog radio frequency (RF) functions for the air interface as well as digital Layer 1, Layer 2, and Layer 3 (of the Open Systems Interconnection (OSI) model) functions for the air interface.

In the exemplary embodiment shown in (L1) FIGS. 1A-1C, each baseband controller 104 comprises Layer-1 (L1) functionality 130, Layer-2 (L2) functionality 132, and Layer-3 (L3) functionality 134 configured to perform at least some of the Layer-1 processing, Layer-2 processing, and Layer-3 processing, respectively, for the LTE air interface implemented by the RAN system 100. Each RP 106 includes (optionally) Layer-1 functionality (not shown) that implements any Layer-1 processing for the air interface that is not performed in the controller 104 and one or more radio frequency (RF) circuits (not shown) that implement the RF front-end functions for the air interface and the one or more antennas 108 associated with that RP 106.

Each baseband controller 104 can be configured to perform all of the digital Layer-1, Layer-2, and Layer-3 processing for the air interface, while the RPs 106 (specifically, the RF circuits) implement only the RF functions for the air interface and the antennas 108 associated with each RP 106. In that case, IQ data representing time-domain symbols for the air interface is communicated between the controller 104 and the RPs 106. Communicating such time-domain IQ data typically requires a relatively high data rate front haul. This approach (communicating time-domain IQ data over the front haul) is suitable for those implementations where the front-haul ETHERNET network 116 is able to deliver the required high data rate.

If the front-haul ETHERNET network 116 is not able to deliver the data rate needed to front haul time-domain IQ data (for example, where the front-haul is implemented using typical enterprise-grade ETHERNET networks), this issue can be addressed by communicating IQ data representing frequency-domain symbols for the air interface between the controllers 104 and the RPs 106. This frequency-domain IQ data represents the symbols in the frequency domain before the inverse fast Fourier transform (IFFT) is performed. The time-domain IQ data can be generated by quantizing the IQ data representing the frequency-domain symbols without guard band zeroes or any cyclic prefix and communicating the resulting compressed, quantized frequency-domain IQ data over the front-haul ETHERNET network 116. Additional details regarding this approach to communicating frequency-domain IQ data can be found in U.S. patent application Ser. No. 13/762,283, filed on Feb. 7, 2013, and titled "RADIO ACCESS NETWORKS," which is hereby incorporated herein by reference. If it is necessary to use even less front haul bandwidth, the transport blocks (that is, the underlying data bits) for the air interface can be communicated between the controllers 104 and the RPs 106.

Where frequency-domain IQ data is front-hauled between the controllers 104 and the RPs 106, each baseband controller 104 can be configured to perform all or some of the digital Layer-1, Layer-2, and Layer-3 processing for the air interface. In this case, the Layer-1 functions in each RP 106 can be configured to implement the digital Layer-1 processing for the air interface that is not performed in the controller 104.

Where the front-haul ETHERNET network 116 is not able to deliver the data rate need to front haul (uncompressed) time-domain IQ data, the time-domain IQ data can be compressed prior to being communicated over the ETHERNET network 116, thereby reducing the data rate needed communicate such IQ data over the ETHERNET network 116.

Data can be front-hauled between the controllers 104 and RPs 106 in other ways.

Each controller 104 and RP 106 (and the functionality described as being included therein) can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106 can be implemented in other ways.

In the exemplary embodiment shown in FIGS. 1A-1C, a management system 136 is communicatively coupled to the controllers 104 and RPs 106, for example, via the Internet 114 and ETHERNET network 116 (in the case of the RPs 106).

In the exemplary embodiment shown in FIGS. 1A-1C, the management system 136 communicates with the various elements of the system 100 using the Internet 114 and the ETHERNET network 116. Also, in some implementations, the management system 136 sends and receives management communications to and from the controllers 104, each of which in turn forwards relevant management communications to and from the RPs 106.

For each UE 110 that is attached to the cell 103, the controller 104 assigns a subset of the RPs 106 to that UE 110, where the RPs 106 in the subset are used to transmit to that UE 100. This subset of RPs 106 is referred to here as the "simulcast zone" for that UE 110.

In the exemplary embodiment described here in connection with FIGS. 1A-1C, the simulcast zone for each UE 110 is determined by the serving controller 104 using a "signature vector" (SV) associated with that UE 110. In this embodiment, a signature vector is determined for each UE 110. The signature vector is determined based on receive power measurements made at each of the RPs 106 serving the cell 103 for uplink transmissions from the UE 110.

When a UE 110 makes initial LTE Physical Random Access Channel (PRACH) transmissions to access the cell 103, each RP 106 will receive those initial PRACH transmissions and a signal reception metric indicative of the power level of the PRACH transmissions received by that RP 106 is measured (or otherwise determined). One example of such a signal reception metric is a signal-to-noise-plus-interference ratio (SNIR). The signal reception metrics that are determined based on the PRACH transmissions are also referred to here as "PRACH metrics."

Each signature vector is determined and updated over the course of that UE's connection to the cell 103 based on Sounding Reference Signals (SRS) transmitted by the UE 110. A signal reception metric indicative of the power level of the SRS transmissions received by the RPs 106 (for example, a SNIR) is measured (or otherwise determined). The signal reception metrics that are determined based on the SRS transmissions are also referred to here as "SRS metrics."

Each signature vector is a set of floating point SINR values (or other metric), with each value or element corresponding to a RP 106 used to serve the cell 103.

The simulcast zone for a UE 110 contains the M RPs 106 with the best SV signal reception metrics, where M is the minimum number of RPs 106 required to achieve a specified SINR. The simulcast zone for a UE 110 is determined by selecting those M RPs 106 based on the current SV.

In this exemplary embodiment, multicast addressing is used for transporting downlink data over the front-haul 116. This is done by defining groups 140 (shown in FIGS. 1B-1C) of RPs 106, where each group 140 is assigned a unique multicast IP address. The switches 118 in the front-haul 115 are configured to support forwarding packets using those multicast IP addresses. Each such group 140 is also referred to here as a "multicast group" 140. The number of RPs 106 that are included in a multicast group 140 is also referred to here as the "size" of the multicast group 140.

The multicast groups 140 can be judiciously selected so that a simulcast zone for any UE 110 can be defined as the union of a small number (for example, 1 or 2) of multicast groups 140. The union of multicast groups 140 that are used to form a simulcast zone for a UE 110 is also referred to here as the "multicast zone" for the UE 110. Example of multicast zones 142 for a UE 110 is shown in FIGS. 1B-1C.

As used here, the "set of multicast groups" 140 refers to a collection of multicast groups 140 that the controller 104 can select from in order to form the multicast zone for a UE's simulcast zone.

In some implementations, a RP 106 can be included in multiple multicast groups 140. In the example shown in FIGS. 1B-1C, the various multicast groups 140 are all included in the set of multicast groups used by a controller 104. In other implementations, each RP 106 is a member of only a single multicast group 140. Moreover, in the example shown in FIGS. 1B and 1C, all of the multicast groups 140 in the set of multicast groups have the same fixed multicast group size of two RPs 106. It is to be understood, however, that multicast groups 140 having a different fixed size could also be used. Also, in other examples, all of the multicast groups 140 in the set of multicast groups do not all have the same multicast group size and, instead, at least one of the multicast groups has a size that differs from the size of at least one of the other multicast groups.

A controller 104 can be configured to form the multicast zone for a UE's simulcast zone by trying to form the multicast zone using various combinations of multicast groups 140 included in the set of multicast groups and determining if each combination results in a suitable multicast zone.

If it is not possible to form a suitable multicast zone for the UE's simulcast zone using any combination of multicast groups 140 included in the set of multicast groups, then an alternative way of transmitting the downlink user data over the front-haul 116 is used. For example, unicast addressing can be used to transmit the downlink user data to the RPs 106 in the UE's simulcast zone. In another alternative, the UE's simulcast zone can be changed to use a default simulcast zone that includes all of the RPs 106. Then, broadcast addressing can be used to transmit the downlink user data to all of the RPs 106.

The controller 104 can be configured to form multicast zones from the set of multicast groups in other ways.

Whether a particular candidate multicast zone is "suitable" can be determined in various ways. For example, a particular candidate multicast zone can be considered suitable if it is the union of small number of non-intersecting multicast groups and it includes all of the RPs 106 in the UE's simulcast zone. Suitability can also be determined in other ways.

Although in the example shown in FIGS. 1B-1C, the size of all multicast groups is the same, it is to be understood that, as noted above, the size of the multicast groups can vary from multicast group to multicast group.

The controller 104 is configured to transmit downlink user data to the RPs 106 in the simulcast zone of a UE 110 by making copies of each transport block (TB) for the downlink user data, one copy for each multicast group 140 in the multicast zone. Each copy is segmented into IP packets that have a destination address that is set to the address of the multicast group 140 associated with that copy. Each IP packet is then transmitted by the baseband unit 104 on the front-haul 115. The Ethernet switches 118 used to implement the front-haul 115 forward the packet to only those RPs 106 that are in the multicast group 140 associated with the destination address of that packet.

As a result, the bandwidth requirements at each RP 106 is minimized, with an increase in the bandwidth requirements at the baseband controller 104 that is a factor of the number of multicast groups 140 typically used to form the multicast zone. In contrast, if unicast addressing where used, the bandwidth requirements at the baseband controller 104 would increase by a factor of the maximum simulcast zone size. Where multicast addressing is used, if each simulcast zone is formed from only a small number of multicast groups 140 that is much less than the maximum simulcast zone size, then the increase in the bandwidth requirements at the baseband controller 104 is much less than would be the case if unicast addressing where used.

If the number of RPs 106 in the system 100 is small enough, it is possible to obtain perfect bandwidth efficiency at both RPs 106 and the baseband units 104 by defining the multicast groups 140 so there is a corresponding multicast group 140 for each possible simulcast zone. If this is the case, then each multicast zone can be formed using a single multicast group 140.

As the number of RPs 106 in the system 100 increases, the corresponding number of possible simulcast zones can become too large to have a corresponding multicast group 140 for each simulcast zone. In this case, the number of multicast groups 140 is limited. This is done by constraining each multicast group 140 to contain a small number of RPs 106 (for example, 4 or fewer) and forming larger simulcast zones (and the associated multicast zone) as a combination of multiple multicast groups 140.

The various multicast groups 140 can be determined at system installation by performing a UE 110 "walk test," for which a SV is determined for a large sample of possible UE positions. At each UE position, for a given multicast group size of N, the N RPs 106 with the largest SV value are identified and a multicast group 140 containing those N RPs 106 is formed. This can be done to identify multicast groups 140 of various sizes (for example, multicast groups containing 2, 3, and 4 RPs 106).

When adding a new multicast group 140, care can be taken not to replicate a multicast group 140 that is already in the set of multicast groups 140. When a new multicast group 140 is added, the switches 118 in the front-haul 115 are notified of the new multicast group 140. After some latency (typically, around 1 second), the switches 118 are able to forward packets using the IP address assigned to that multicast group 140.

Figure 2:
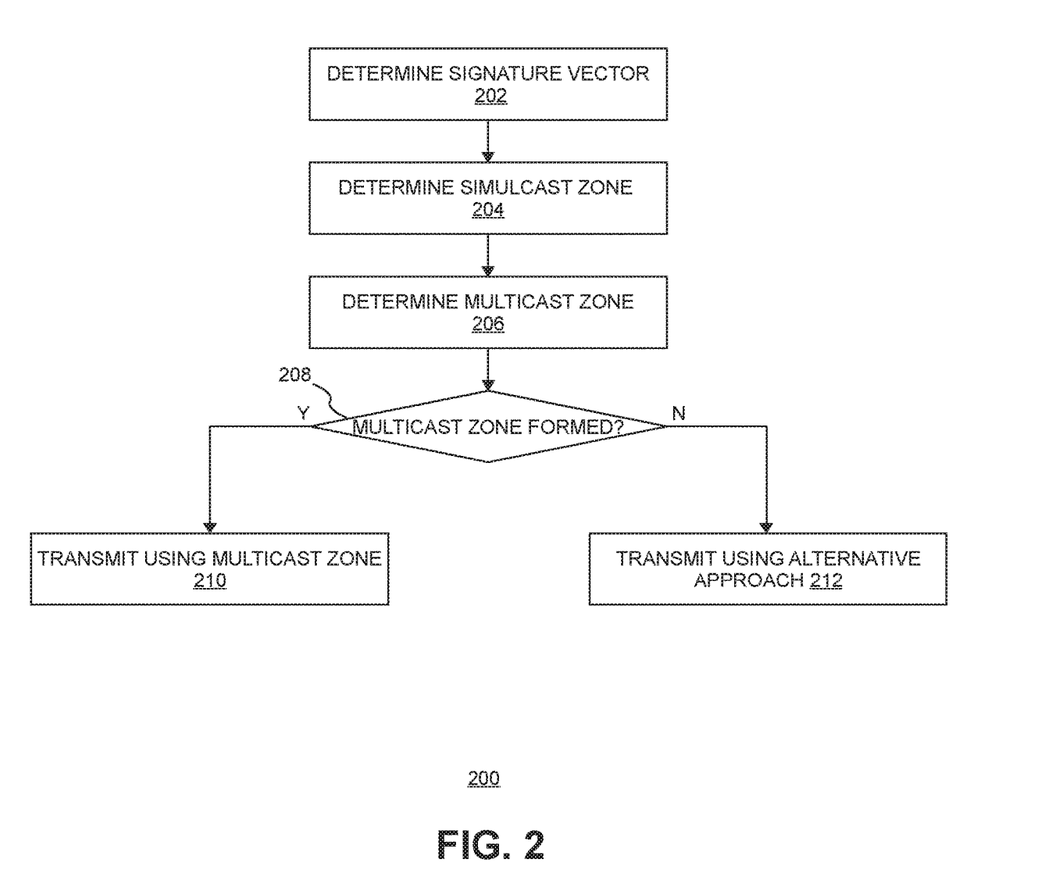
FIG. 2 comprises a high-level flow chart illustrating one exemplary embodiment of a method of using multicast for downlink front-haul communications in a C-RAN.

FIG. 2 comprises a high-level flow chart illustrating one exemplary embodiment of a method 200 of using multicast for downlink front-haul communications in a C-RAN. The embodiment of method 200 shown in FIG. 2 is described here as being implemented in the C-RAN system 100 of FIG. 1, though it is to be understood that other embodiments can be implemented in other ways.

The blocks of the flow diagram shown in FIG. 2 have been arranged in a generally sequential manner for ease of explanation; however, it is to be understood that this arrangement is merely exemplary, and it should be recognized that the processing associated with method 200 (and the blocks shown in FIG. 2) can occur in a different order (for example, where at least some of the processing associated with the blocks is performed in parallel and/or in an event-driven manner). Also, most standard exception handling is not described for ease of explanation; however, it is to be understood that method 200 can and typically would include such exception handling.

Method 200 is described here as being performed for each UE 110 when the simulcast zone for the UE 110 is determined. The particular UE 110 for which method 200 is being performed is referred to here as the "current" UE 110.

Method 200 comprises determining the signature vector for the current UE 110 (block 202). This is done when the UE 110 initially connects to the cell 103 and, thereafter, periodically when the SV for the UE 110 is updated.

Method 200 further comprises determining the simulcast zone for the current UE 110 based on the UE's current SV (block 204). As noted above, the simulcast zone for a UE 110 contains the M RPs 106 with the best SV signal reception metrics, where M is the minimum number of RPs 106 required to achieve a specified SINR. The simulcast zone for the current UE 110 is determined by selecting those M RPs 106 based on the current SV for the current UE 110.

Method 200 further comprises forming a multicast zone for the current simulcast zone (block 206). In general, this is done by the controller 104 attempting to form a suitable multicast zone for the current UE's simulcast zone from the set of multicast groups as described above.

Method 200 further comprises determining if a suitable multicast zone can be formed for the current UE's simulcast zone (checked in block 208) and, if one can be, transmitting downlink user data for the current UE 110 to the RPs 106 in its simulcast zone using that multicast zone (block 210). As noted above, the controller 104 is configured to transmit downlink user data in this way by making copies of each TB for the downlink user data, one copy for each multicast group 140 in the multicast zone. Each copy is segmented into IP packets that have a destination address that is the address of the multicast group 140 associated with that copy. Each IP packet is then transmitted by the controller 104 on the front-haul 115. The Ethernet switches 118 used to implement the front-haul 115 forward the packet to only those RPs 106 that are in the multicast group 140 associated with the destination address of that packet.

As a result, the bandwidth requirements at each RP 106 is minimized, with an increase in the bandwidth requirements at the controller 104 that is only a factor of the number of multicast groups 140 in the multicast zone set, which typically will be a small number.

Method 200 further comprises, if a suitable multicast zone cannot be formed for the current UE's simulcast zone, transmitting downlink user data for the current UE 110 over the front-haul 115 using an alternative approach (block 212). For example, as noted above, unicast addressing can be used to transmit the downlink user data to the RPs 106 in the current UE's simulcast zone. In another alternative, the current UE's simulcast zone can be changed to use a default simulcast zone that includes all of the RPs 106. Then, broadcast addressing can be used to transmit the downlink user data to all of the RPs 106.

The set of multicast groups used for forming multicast zones can be dynamically determined and updated by the controller 104. For example, the set of multicast groups can be updated when the controller 104 is unable to form a multicast zone for a given UE 110. One example of this approach is shown in FIG. 3.

Figure 3:
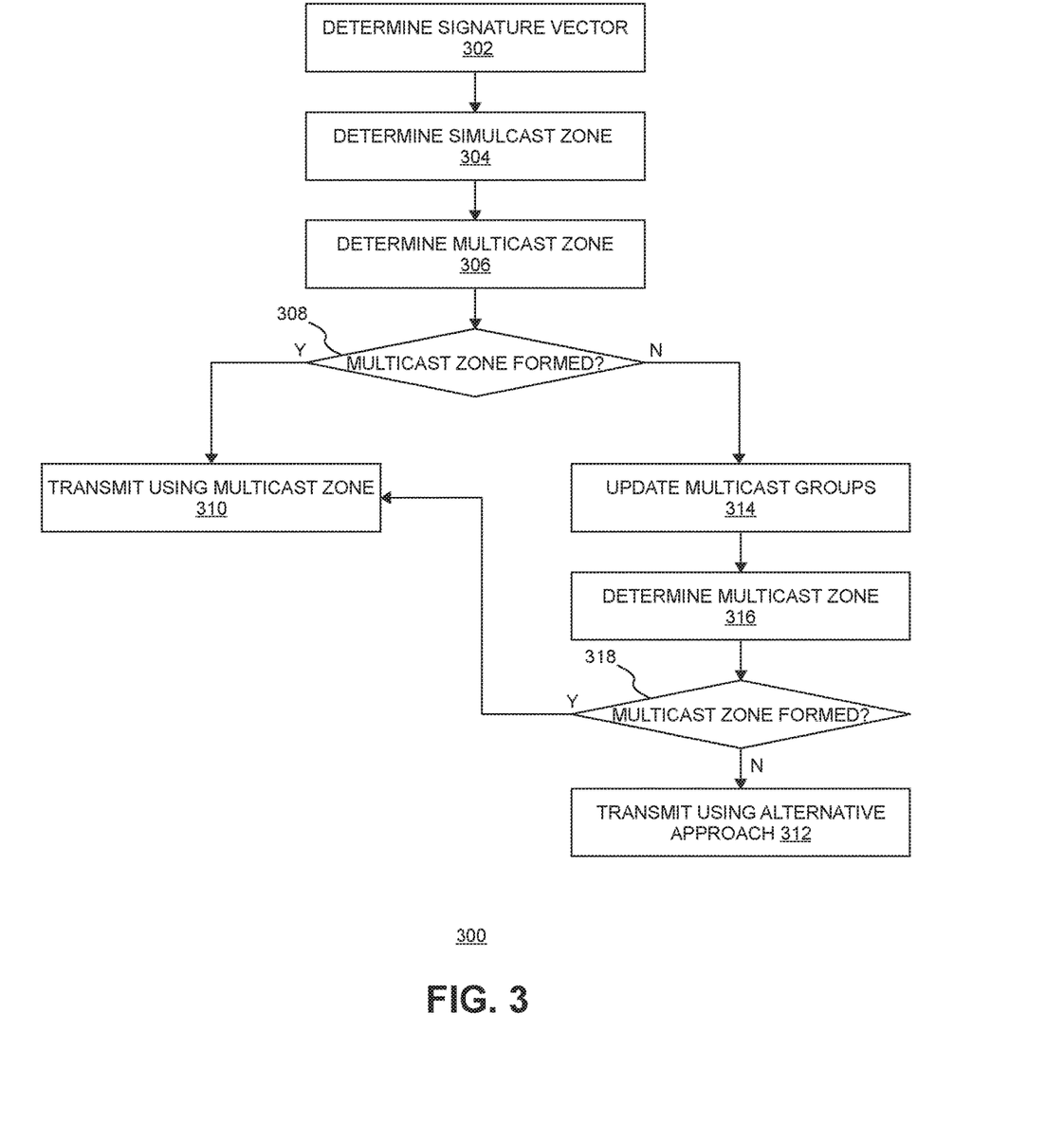
FIG. 3 comprises a high-level flow chart illustrating one exemplary embodiment of a method of using multicast for downlink front-haul communications in a C-RAN.

FIG. 3 comprises a high-level flow chart illustrating one exemplary embodiment of a method 300 of using multicast for downlink front-haul communications in a C-RAN. The embodiment of method 300 shown in FIG. 3 is described here as being implemented in the C-RAN system 100 of FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

In general, method 300 proceeds as described above in connection with FIG. 2 except as described below. Moreover, features shown in FIG. 3 using reference numerals that have the same last two digits as features shown in FIG. 2 are, except as described below, substantially the same and the associated description of such features set forth above in connection with FIG. 2 applies to the respective features shown in FIG. 3, the description of which is not repeated for the sake of brevity.

In method 300, if, after attempting to form a suitable multicast zone for the simulcast zone of the current UE 110 (in connection with block 306), a suitable multicast zone cannot be formed for the current UE's simulcast zone (checked in block 308), the set of multicast groups is updated (block 314). This updating of the set of multicast groups can include deleting, adding, or changing (or combinations thereof) one or more multicast groups included in the set of multicast groups.

In one implementation, when attempting to form a suitable multicast zone for the current UE's simulcast zone, one or more RPs 106 in the current UE's simulcast zone may not be included in any multicast group included in that set. Such RPs 106 are referred to here as "remaining RPs 106."

In one implementation, if the number N of remaining RPs 106 is a multiple of the multicast group size S for the set of multicast groups, then a number M of new multicast groups can be added to that set, where M is equal to N divided by S. Each successive new multicast group is formed by selecting, from the remaining RPs 106 that have not yet been added to a new multicast group, the S RPs 106 that have the best signal reception metric in the SV for the current UE 110. These new multicast groups are added to the set of multicast groups. As a result, a suitable multicast zone should be able to be formed by using the new multicast groups along with any of the existing multicast groups that include RPs 106 in the current UE's simulcast zone.

The new multicast groups can be added to the set of multicast groups if doing so would not cause the number of multicast groups in that set to exceed a predetermined maximum.

If the number N of remaining RPs 106 is not a multiple of the multicast group size S for that set or if adding the new multicast groups would cause the number of multicast groups in that set to exceed a predetermined maximum, any multicast groups in that set for which deletion criteria are met are purged (deleted) from the set. For example, in one implementation, the deletion criteria are met for any multicast group that has not been used to form a multicast zone for any UE 110 within a predetermined period of time (for example, within a predetermined number of TTIs). In another implementation, the deletion criteria are configured so that a configurable number of the least used multicast groups in the set are purged each time a purge operation is performed. In other implementations, other criteria are used.

If, as a result of performing the purge operation, one or more multicast groups are deleted, the remaining RPs 106 can be updated by determining which RPs 106 in the current UE's simulcast zone are not included in any of the remaining multicast groups in the set. Then, the number of such remaining RPs 106 is checked to see if it is a multiple of the multicast group size S for the current set of the multicast groups and, if that is the case, additional multicast groups are added as described above.

Method 300 further comprises, after updating the set of multicast groups, forming a multicast zone for the current simulcast zone (block 316). If a suitable multicast zone can be formed for the current UE's simulcast zone after updating the set of multicast groups (checked in block 318), downlink user data for the current UE 110 is transmitted to the RPs 106 in its simulcast zone using that multicast zone as described above (block 310).

If a suitable multicast zone still cannot be formed for the current UE's simulcast zone after updating the set of multicast groups, downlink user data for the current UE 110 is transmitted over the front-haul 116 using an alternative approach as described above (block 312).

The set of multicast groups used for forming multicast zones can be dynamically determined and updated by the controller 104 in other ways. For example, the set of multicast groups can be updated periodically. One example of this approach is shown in FIG. 4.

Figure 4:
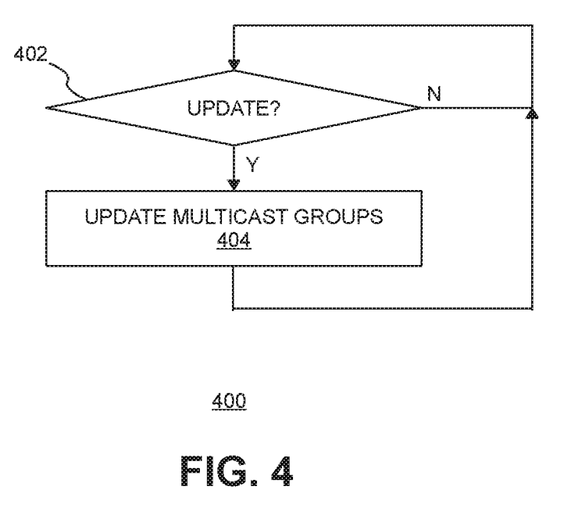
FIG. 4 comprises a high-level flow chart illustrating one exemplary embodiment of a method of updating a set of multicast groups used for forming multicast zones.

FIG. 4 comprises a high-level flow chart illustrating one exemplary embodiment of a method 400 of updating a set of multicast groups used for forming multicast zones. The embodiment of method 400 shown in FIG. 4 is described here as being implemented in the C-RAN system 100 of FIG. 1, though it is to be understood that other embodiments can be implemented in other ways.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

Periodically (checked in block 402), the controller 104 updates the set of multicast groups (block 404). This updating of the set of multicast groups can include deleting, adding, or changing (or combinations thereof) one or more multicast groups included in the set of multicast groups.

For example, when this update operation is performed, the controller 104 can attempt to purge (delete) one or more multicast groups from the set of multicast groups. This can be done as described above in connection with FIG. 3 by checking if deletion criteria are met for any multicast group in the set of multicast groups. If deletion criteria are met for any multicast group in the set of multicast groups, the controller 104 deletes the associated multicast group from the set. For example, in one implementation, the deletion criteria are met for any multicast group that has not been used to form a multicast zone for any UE 110 within a predetermined period of time (for example, within a predetermined number of TTIs). In another implementation, the deletion criteria are configured so that a configurable number of the least used multicast groups in the set are purged each time a purge operation is performed. In other implementations, other criteria are used.

Also, the controller 104 can track metrics associated with the various SVs that it determines for various UE 110 (or store the SVs themselves) and then use those metrics (or the SVs themselves) to determine which multicast groups should be added, deleted, or changed.

Other embodiments can be implemented in other ways.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system to provide wireless service comprising: a controller; and a plurality of radio points; wherein each of the radio points is associated with at least one antenna and remotely located from the controller, wherein the plurality of radio points is communicatively coupled to the controller over a front haul; wherein the controller and the plurality of radio points are configured to implement a base station in order to provide wireless service to a plurality of user equipment (UEs) using a cell; wherein the controller is communicatively coupled to a core network of a wireless service provider; wherein the controller is configured to determine a simulcast zone for a UE, the simulcast zone comprising a plurality of radio points from which downlink user data is wirelessly communicated to the UE; wherein the controller is configured to attempt to form a multicast zone for the simulcast zone, the multicast zone comprising a plurality of multicast groups implemented by the front haul; wherein the controller is configured to, if the multicast zone is successfully formed, transmit downlink user data for the UE to the radio points in the simulcast zone over the front haul by transmitting the downlink user data to the multicast groups.

Example 2 includes the system of Example 1, wherein the front haul is implemented using a switched Ethernet network.

Example 3 includes the system of Example 2, wherein the switched Ethernet network comprises at least one Ethernet switch that is configured to implement the multicast groups.

Example 4 includes the system of any of the Examples 2-3, wherein each multicast group comprises an associated multicast Internet Protocol (IP) address.

Example 5 includes the system of any of the Examples 1-4, wherein the controller is configured to determine a signature vector for the UE, the signature vector comprising a respective signal reception metric for each radio point; and wherein the controller is configured to determine the simulcast zone for the UE based on the signature vector.

Example 6 includes the system of any of the Examples 1-5, wherein the controller is configured to attempt to form the multicast zone for the simulcast zone using a set of multicast groups.

Example 7 includes the system of Example 6, wherein the controller is configured to dynamically update the set of multicast groups.

Example 8 includes the system of any of the Examples 6-7, wherein the controller is configured to, if the multicast zone is not successfully formed, dynamically update the set of multicast groups and attempt to form the multicast zone for the simulcast zone using the dynamically updated set of multicast groups.

Example 9 includes the system of any of the Examples 1-8, wherein the controller is configured to, if the multicast zone is not successfully formed, transmit downlink user data for the UE over the front haul using an alternative approach.

Example 10 includes the system of Example 9, wherein the alternative approach comprises at least one: transmitting downlink user data for the UE over the front haul using unicast addressing; and changing the simulcast zone for the UE to include all radio points and transmitting downlink user data for the UE over the front haul using broadcast addressing.

Example 11 includes a method of providing wireless service to user equipment (UE) using a system comprising a controller and a plurality of radio points, wherein each of the radio points is associated with at least one antenna and remotely located from the controller, wherein the plurality of radio points is communicatively coupled to the controller over a front haul, and wherein the controller and the plurality of radio points are configured to implement a base station in order to provide wireless service to a plurality of user equipment (UEs) using a cell, the method comprising: determining a simulcast zone for a UE, the simulcast zone comprising a plurality of radio points from which downlink user data is wirelessly communicated to the UE; attempting to form a multicast zone for the simulcast zone, the multicast zone comprising a plurality of multicast groups implemented by the front haul; and if the multicast zone is successfully formed, transmitting downlink user data for the UE to the radio points in the simulcast zone over the front haul by transmitting the downlink user data to the multicast groups.

Example 12 includes the method of Example 11, wherein the front haul is implemented using a switched Ethernet network.

Example 13 includes the method of Example 12, wherein the switched Ethernet network comprises at least one Ethernet switch that is configured to implement the multicast groups.

Example 14 includes the method of any of the Examples 12-13, wherein each multicast group comprises an associated multicast Internet Protocol (IP) address.

Example 15 includes the method of any of the Examples 11-14, wherein the method further comprises determining a signature vector for the UE, the signature vector comprising a respective signal reception metric for each radio point; and wherein determining the simulcast zone for the UE comprises determining the simulcast zone based on the signature vector.

Example 16 includes the method of any of the Examples 11-15, wherein attempting to form the multicast zone for the simulcast zone comprises attempting to form the multicast zone for the simulcast zone using a set of multicast groups.

Example 17 includes the method of Example 16, wherein the method further comprises dynamically updating the set of multicast groups.

Example 18 includes the method of any of the Examples 16-17, wherein the method further comprises, if the multicast zone is not successfully formed, dynamically updating the set of multicast groups and attempting to form the multicast zone for the simulcast zone using the dynamically updated set of multicast groups.

Example 19 includes the method of any of the Examples 11-18, wherein the method further comprises, if the multicast zone is not successfully formed, transmitting downlink user data for the UE over the front haul using an alternative approach.

Example 20 includes the method of Example 19, wherein the alternative approach comprises at least one: transmitting downlink user data for the UE over the front haul using unicast addressing; and changing the simulcast zone for the UE to include all radio points and transmitting downlink user data for the UE over the front haul using broadcast addressing.

What is claimed is:

1. A system to provide wireless service comprising:
a controller; and
a plurality of radio points;
wherein each of the radio points is associated with a respective at least one antenna, wherein the plurality of radio points is communicatively coupled to the controller over a front haul;
wherein the controller and the plurality of radio points are configured to implement a base station in order to provide wireless service to a plurality of user equipment (UEs) using a cell;
wherein the controller is communicatively coupled to a core network of a wireless service provider;
wherein the controller is configured to determine a respective simulcast zone for each respective UE of the plurality of UEs, the simulcast zone comprising a respective subset of radio points of the plurality of radio points from which respective downlink user data is wirelessly communicated to the respective UE of the plurality of UEs;
wherein the controller is configured to attempt to form a respective multicast zone for the respective UE of the plurality of UEs that is suitable for the respective simulcast zone determined for the respective UE of the plurality of UEs, the respective multicast zone for each respective UE of the plurality of UEs comprising a respective subset of multicast groups selected from a set of multicast groups implemented by the front haul, wherein at least one multicast group in the set of multicast groups includes two or more radio points of the plurality of radio points;
wherein the controller is configured to determine whether the respective multicast zone for a first respective UE of the plurality of UEs is a suitable multicast zone for the respective simulcast zone for the first respective UE of the plurality of UEs;
wherein the controller is configured to, in response to a determination that the respective multicast zone for the first respective UE of the plurality of UEs is a suitable multicast zone for the respective simulcast zone for the first respective UE of the plurality of UE, transmit respective front haul downlink user data for the first respective UE to the radio points in the respective simulcast zone for the first respective UE of the plurality of UEs over the front haul by transmitting the respective front haul downlink user data to the respective subset of multicast groups implemented by the front haul that are included in the respective multicast zone for the first respective UE of the plurality of UEs; and wherein the respective simulcast zone determined for at least one respective UE of the plurality of UEs differs from the respective simulcast zone determined for at least one other respective UE of the plurality of UEs.

2. The system of claim 1, wherein the front haul is implemented using a switched Ethernet network.

3. The system of claim 2, wherein the switched Ethernet network comprises at least one Ethernet switch that is configured to implement the multicast groups.

4. The system of claim 2, wherein each multicast group comprises an associated multicast Internet Protocol (IP) address.

5. The system of claim 1, wherein the controller is configured to determine a respective signature vector for each respective UE of the plurality of UEs, the respective signature vector for each respective UE of the plurality of UEs comprising a respective signal reception metric for each radio point; and wherein the controller is configured to determine the simulcast zone for each respective UE of the plurality of UEs based on the respective signature vector.

6. The system of claim 1, wherein the controller is configured so that the respective multicast zone for each respective UE of the plurality of UEs comprises one or more multicast groups selected from the set of multicast groups implemented by the front haul.

7. The system of claim 1, wherein the controller is configured to dynamically update the set of multicast groups.

8. The system of claim 1, wherein the controller is configured to, in response to a determination that the respective multicast zone for the first respective UE of the plurality of UEs is not a suitable multicast zone for the respective simulcast zone for the first respective UE of the plurality of UEs, dynamically update the set of multicast groups and attempt to form the respective multicast zone for the first respective UE of the plurality of UEs from the respective simulcast zone using the dynamically updated set of multicast groups.

9. The system of claim 1, wherein the controller is configured to, in response to a determination that the respective multicast zone for the first respective UE of the plurality of UEs is not a suitable multicast zone for the respective simulcast zone for the first respective UE of the plurality of UEs, transmit the respective front haul downlink user data for the first respective UE of the plurality of UEs over the front haul using an alternative approach.

10. The system of claim 9, wherein the alternative approach comprises at least one:

transmitting the respective front haul downlink user data for the first respective UE of the plurality of UEs over the front haul using unicast addressing; and changing the respective simulcast zone for the first respective UE of the plurality of UEs to include all radio points and transmitting the respective front haul downlink user data for the first respective UE of the plurality of UEs over the front haul using broadcast addressing.

11. A method of providing wireless service using a system comprising a controller and a plurality of radio points, wherein each of the radio points is associated with a respective at least one antenna, wherein the plurality of radio points is communicatively coupled to the controller over a front haul, and wherein the controller and the plurality of radio points are configured to implement a base station in order to provide wireless service to a plurality of user equipment (UEs) using a cell, the method comprising:

determining a respective simulcast zone for each respective UE of the plurality of UEs, the respective simulcast zone comprising a respective subset of radio points of the plurality of radio points from which respective downlink user data is wirelessly communicated to the respective UE of the plurality of UEs;

attempting to form a respective multicast zone for the respective UE of the plurality of UEs that is suitable for the respective simulcast zone determined for the respective UE of the plurality of UEs, the respective multicast zone for each respective UE of the plurality of UEs comprising a respective subset of multicast groups selected from a set of multicast groups implemented by the front haul, wherein at least one multicast group in the set of multicast groups includes two or more radio points of the plurality of radio points;

determining whether the respective multicast zone for a first respective UE of the plurality of UEs is a suitable multicast zone for the respective simulcast zone for the first respective UE of the plurality of UEs; and in response to a determination that the respective multicast zone for the first respective UE of the plurality of UEs is a suitable multicast zone for the respective simulcast zone for the first respective UE of the plurality of UEs, transmitting respective front haul downlink user data for the first respective UE of the plurality of UEs to the radio points in the respective simulcast zone for the first respective UE of the plurality of UEs over the front haul by transmitting the respective front haul downlink user data to the respective subset of multicast groups implemented by the front haul that are included in the respective multicast zone for the first respective UE of the plurality of UEs; and wherein the respective simulcast zone determined for at least one respective UE of the plurality of UEs differs from the respective simulcast zone determined for at least one other respective UE of the plurality of UEs.

12. The method of claim 11, wherein the front haul is implemented using a switched Ethernet network.

13. The method of claim 12, wherein the switched Ethernet network comprises at least one Ethernet switch that is configured to implement the multicast groups.

14. The method of claim 12, wherein each multicast group comprises an associated multicast Internet Protocol (IP) address.

15. The method of claim 11, wherein the method further comprises determining respective signature vector for each respective UE of the plurality of UEs, the respective signature vector for each respective UE of the plurality of UEs comprising a respective signal reception metric for each radio point; and wherein determining the simulcast zone for each respective UE of the plurality of UEs is based on the respective signature vector.

16. The method of claim 11, wherein the respective multicast zone for each respective UE of the plurality of UEs comprises one or more multicast groups selected from the set of multicast groups implemented by the front haul.

17. The method of claim 11, wherein the method further comprises dynamically updating the set of multicast groups.

18. The method of claim 11, wherein the method further comprises, in response to a determination that the respective multicast zone for the first respective UE of the plurality of UEs is not a suitable multicast zone for the respective simulcast zone for the first respective UE of the plurality of UEs, dynamically updating the set of multicast groups and attempting to form the respective multicast zone for the first respective UE of the plurality of UEs from the respective simulcast zone using the dynamically updated set of multicast groups.

19. The method of claim 11, wherein the method further comprises, in response to a determination that the respective multicast zone for the first respective UE of the plurality of UEs is not a suitable multicast zone for the respective simulcast zone for the first respective UE of the plurality of UEs, transmitting the respective front haul downlink user data for the first respective UE of the plurality of UEs over the front haul using an alternative approach.

20. The method of claim 19, wherein the alternative approach comprises at least one:
transmitting the respective front haul downlink user data for the first respective UE of the plurality of UEs over the front haul using unicast addressing; and
changing the respective simulcast zone for the first respective UE of the plurality of UEs to include all radio points and transmitting the respective front haul downlink user data for the first respective UE of the plurality of UEs over the front haul using broadcast addressing.

21. The system of claim 1, wherein the controller is configured so that the respective simulcast zone determined for the first respective UE of the plurality of UEs changes over time, wherein the controller is configured to attempt to form a respective different multicast zone for the first respective UE of the plurality of UEs for each different simulcast zone determined for the first respective UE of the plurality of UEs.

22. The method of claim 12, wherein the respective simulcast zone determined for the first respective UE of the plurality of UEs changes over time, wherein the method comprises attempting to form a respective different multicast zone for the first respective UE of the plurality of UEs for each different simulcast determined for the first respective UE of the plurality of UEs.

23. The system of claim 1, wherein the respective multicast zone for the first respective UE of the plurality of UEs comprises two or more multicast groups selected from the set of multicast groups implemented by the front haul.

24. The system of claim 23, wherein the two or more multicast groups selected from the set of multicast groups implemented by the front haul do not share a common radio point.

25. The system of claim 23, wherein the respective multicast zone for the first respective UE of the plurality of UEs is determined to be a suitable multicast zone for the respective simulcast zone for the first respective UE of the plurality of UEs when the two or more multicast groups selected from the set of multicast groups implemented by the front haul exactly equal the respective simulcast zone for the first respective UE of the plurality of UEs.

* * * * *